R. Plews,

Soldering Spinning Frame Cylinders.

N° 30,931.    Patented Dec. 18, 1860.

Witnesses.

Inventor.
Robert Plews

UNITED STATES PATENT OFFICE.

ROBERT PLEWS, OF SMITHFIELD, RHODE ISLAND.

IMPROVED CYLINDER FOR SPINNING-FRAMES.

Specification forming part of Letters Patent No. 30,931, dated December 18, 1860.

*To all whom it may concern:*

Be it known that I, ROBERT PLEWS, of Smithfield, in the State of Rhode Island, have invented a new and useful Improvement in the Method of Making the Tin Cylinders for Self-Operating Mules, Twisters, and Spinning-Frames; and I do hereby declare that the following specification, taken in connection with the drawings making a part of the same, is a full, clear, and exact description thereof.

Figure 1:
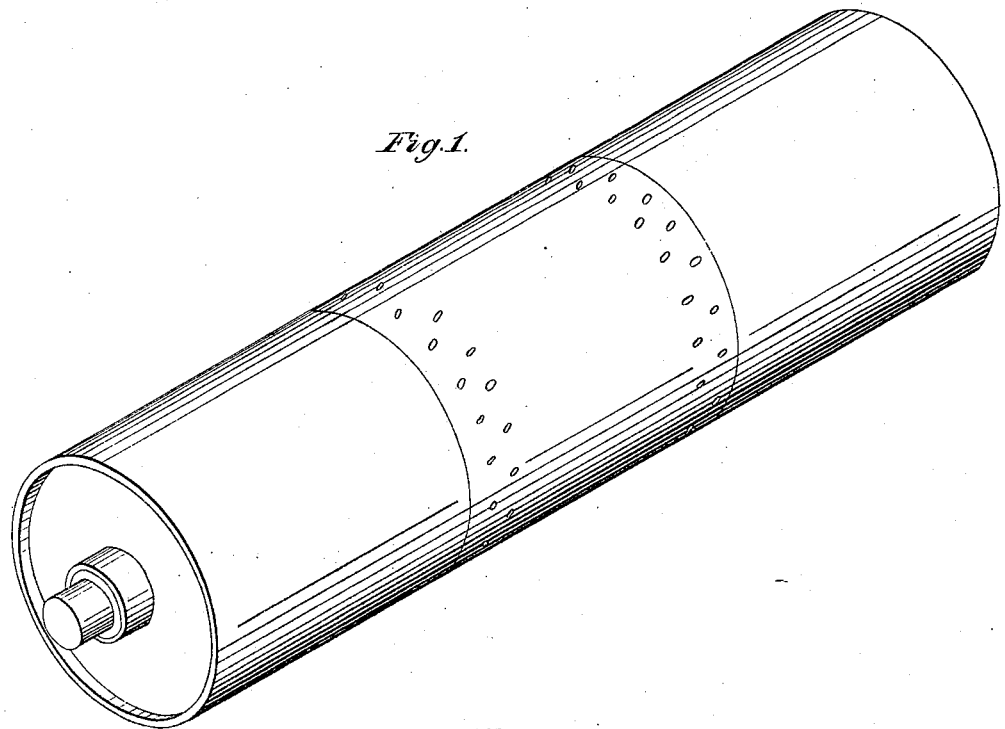
Figure 2:
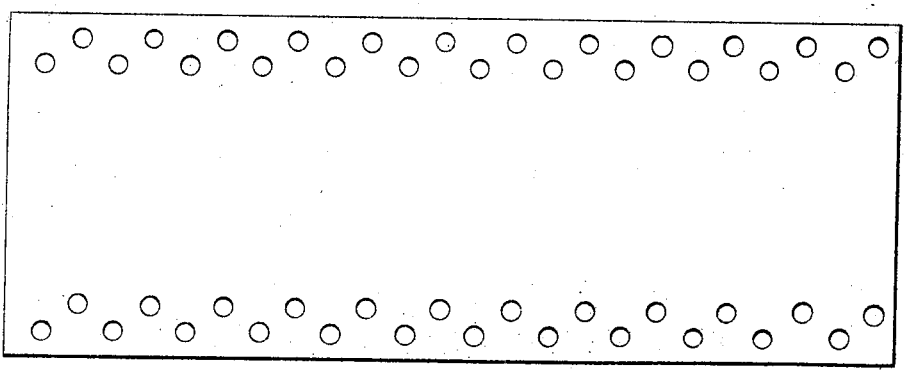

Figure 1 is a view of the cylinder. Fig. 2 is a view of the manner in which each of the sheets of tin of which the cylinder is composed is prepared.

A cylinder for a self-operating mule-spinner or other spinning-frame to be of any value must combine lightness with strength. They are usually from fourteen to eighteen feet in length and about seven inches in diameter. For many years tin-plate has been used in their construction, each cylinder being composed of a series of short cylinders made from a single sheet of plate, the joints slipped together like the sections of a stove-pipe and secured with solder. The difficulty which has been experienced has consisted in being able to cause solder enough to flow into the joints of the several sections to make a cylinder of the ordinary length sufficiently stiff to resist the strain of the cords which drive the spindles.

My improvement consists in a process of manufacture by which a cylinder, although composed of a series of sections, may be made as strong as if composed of one entire sheet of tin. Said process is as follows: I perforate the edges of each sheet of the tin-plate with a number of holes arranged substantially as shown in Fig. 2. The several sections of the cylinder are then made as heretofore, and two of the sections slip-jointed together as is now done. Solder is now placed upon any one of the holes at the joint and the hot iron applied. The heat of the iron expels the air from between the surfaces, which escaping at the nearest hole permits the solder to flow along the whole extent of the lap. More solder is then placed in each hole in succession, if required, and thus the entire surfaces in contact are completely united. Another section is then slipped on, and the same operation is repeated until the cylinder is of the desired length. It is evident that a cylinder thus constructed may be made of as great strength at the joints as if it were composed of a continuous piece of metal.

What I claim as my invention, and desire to secure by Letters Patent, is—

The improvement in the process of manufacturing tin-plate cylinders described, consisting in perforating the edge of each plate of which the several sections of the cylinder are composed with a series of holes, whereby on the application of heat the air is expelled and the soldering metal is permitted to flow over the entire surfaces in contact.

ROBERT PLEWS.

Witnesses:
B. F. THURSTON,
JOHN GARTLAND.